INVENTOR.
MEREDITH M. NYBORG,
BY
Walter R. Thiel
ATTORNEY.

June 22, 1965

M. M. NYBORG 3,191,000

PRECISION WELDING HEAD

Filed May 31, 1963

INVENTOR.
MEREDITH M. NYBORG
BY
Walter R. Thiel
ATTORNEY.

United States Patent Office

3,191,000
Patented June 22, 1965

3,191,000
PRECISION WELDING HEAD
Meredith M. Nyborg, Camarillo, Calif., assignor to Hughes Aircraft Company, Culver City, Calif., a corporation of Delaware
Filed May 31, 1963, Ser. No. 284,460
8 Claims. (Cl. 219—86)

This invention relates to a welding head and more particularly to an improved resistance welding head adaptable for spot welding operations.

Generally, a resistance welding head includes a first electrode supported in a fixed position and a second electrode mounted on a carrier member which is movable with respect to the first electrode. The work is normally disposed between the two electrodes and a force is applied to the movable electrode so as to urge it against the work. When this force reaches preselected magnitude a switch is actuated which completes an electrical circuit. Welding current then flows between the electrodes and through the work and welding occurs at the precise electrode force appropriate for a proper weld.

While presently available welding heads of the type above described are of utility in some spot welding applications they have disadvantages for certain applications because the movable electrode is not restricted to a linear or vertical movement but may also have an arcuate or transverse movement. In these heads, while the movable electrode moves generally linearly until it makes contact with the work to be welded, the application of the preselected force may cause the movable electrode to roll off of a round work object such as a wire because it is not restricted to vertical movement. In addition, if it is not restricted once the metal reaches the liquid state the electrode may follow the flow of the metal, thus again having a transverse movement.

Therefore, an object of this invention is to provide an improved resistance welding head.

Another object of this invention is to provide an improved welding head which includes a rotation control mechanism to restrict the transverse movement of the electrode tip of the movable electrode assembly after it makes contact with the workpiece.

A further object of this invention is to provide an improved welding head which includes a rotation control mechanism to prevent random rotation of the ram member during the movement of the movable electrode assembly into contact with the workpiece.

A still further object of this invention is to provide an improved welding head having structural features adapted to provide excellent work area visibility and effortless operation.

Briefly, the improved welding head of the present invention includes a first electrode supported in a fixed position, a second electrode mounted on a carrier member which is movable with respect to the first electrode and a pair of guide rods positioned adjacent to the carrier member each in engagement with a different antifriction member mounted on the carrier member so that the movement of the second electrode assembly is restricted to a predetermined path and the second electrode is prevented from transverse movement after it makes contact with the workpiece.

These and other objects and advantages will be apparent from the following description taken in accordance with the drawings throughout which like reference characters indicate like parts, and in which.

Figure 1:
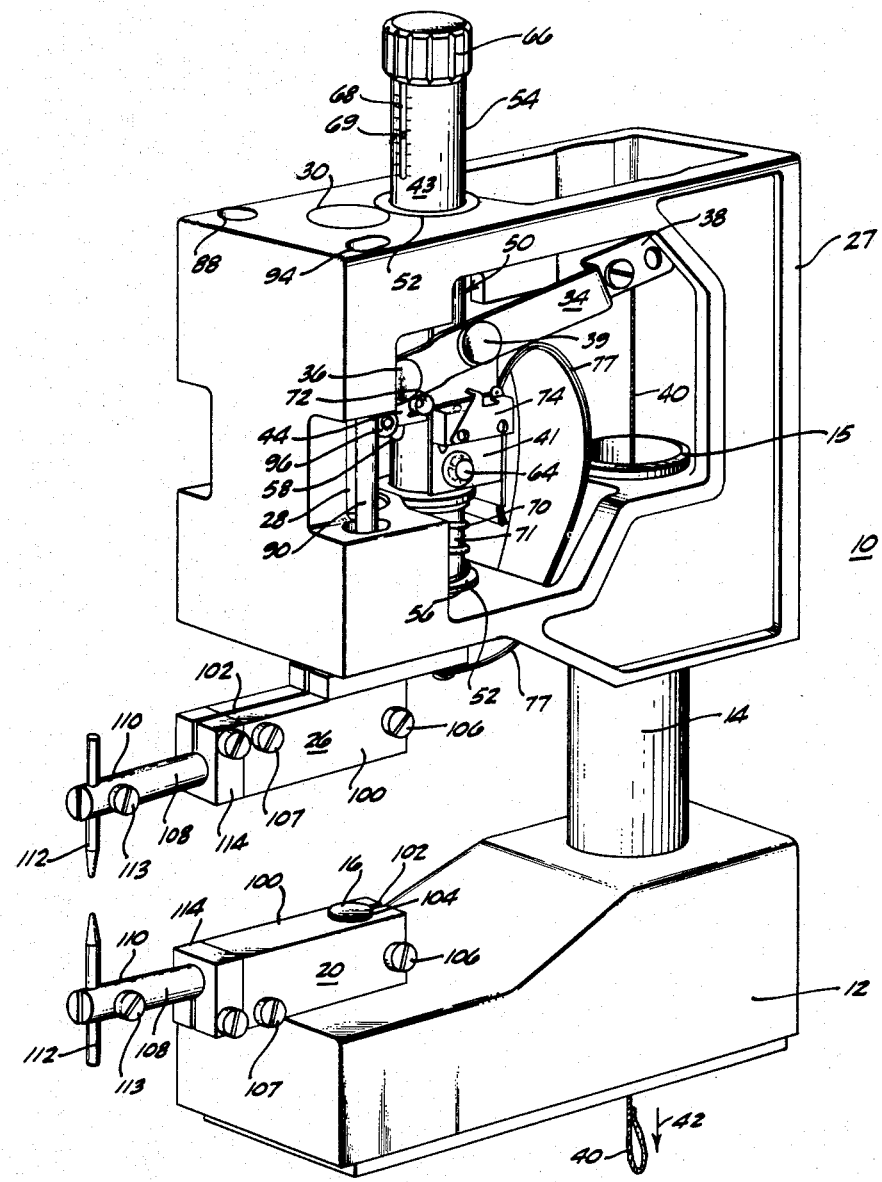
FIGURE 1 is a perspective view of an embodiment of the present invention showing the head with the cover removed to illustrate the structural elements positioned within the assembly.
Figures 3, 4:
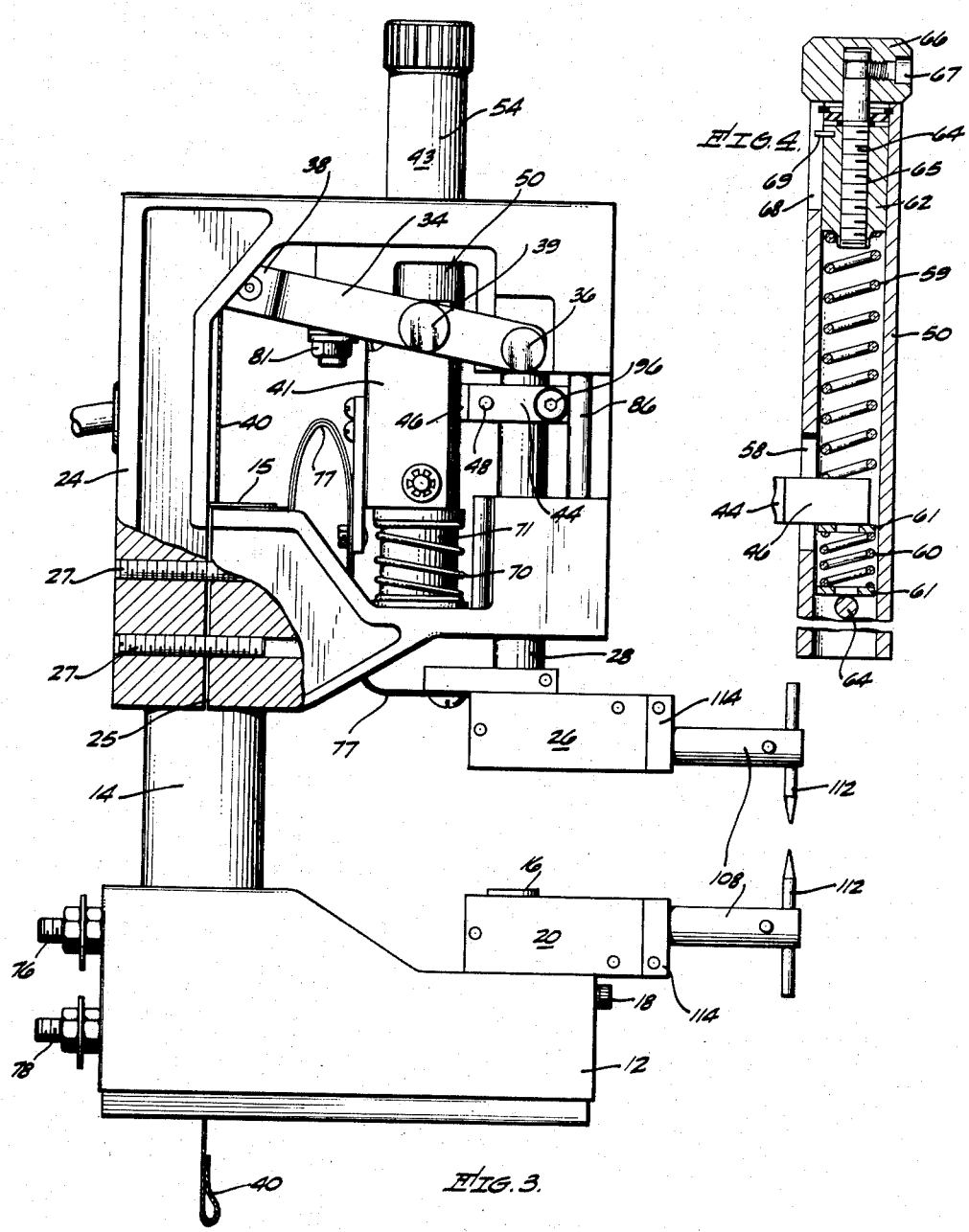

FIG. 3 is an elevational view of the left side of the embodiment of the present invention shown in FIG. 1 and having a portion of the frame cut away illustrating the clamping slot and clamping screws; and FIG. 4 is a medial sectional view of the welding force control cylinder and a portion of the yoke assembly showing the projection therefrom illustrating the mechanism utilized to provide a controllable welding force.

Figure 2:
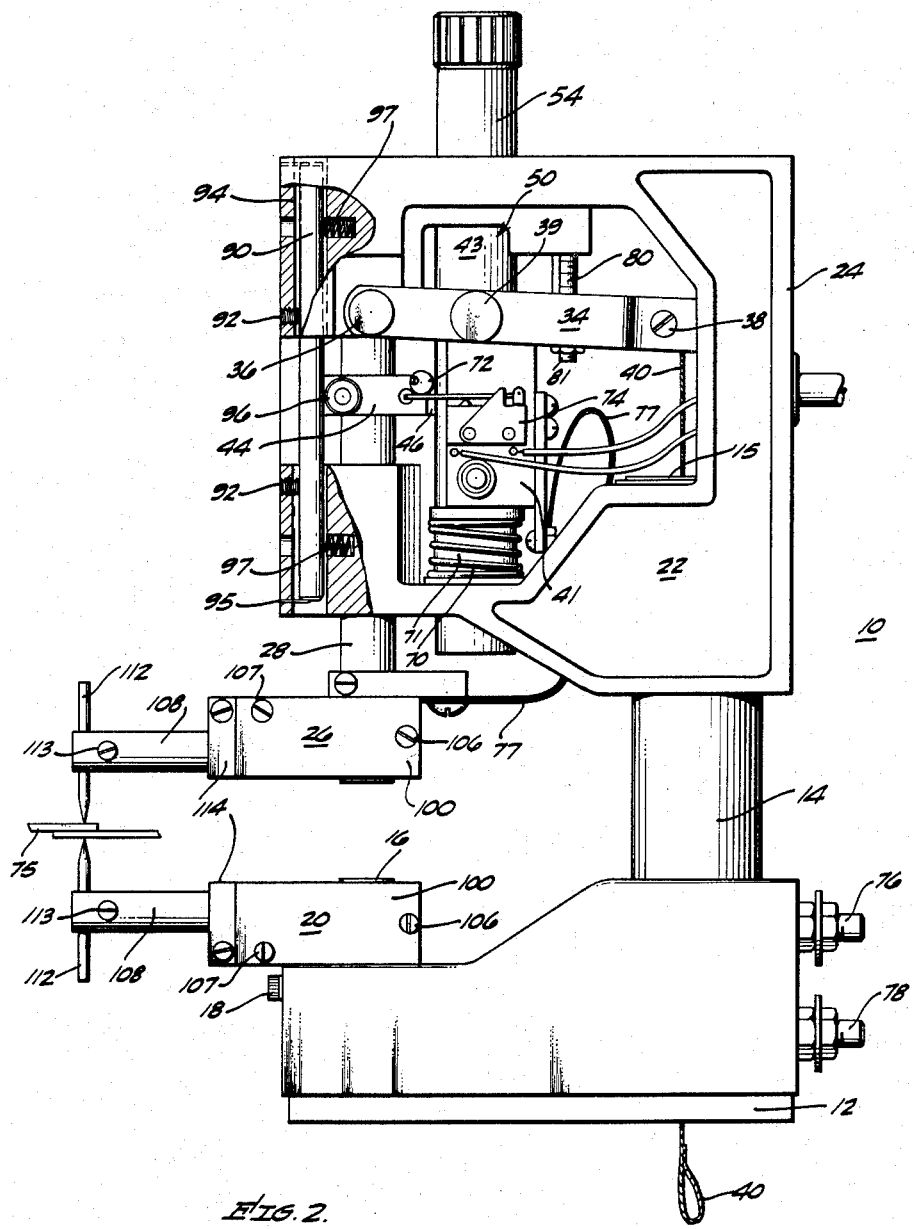
FIG. 2 is a side elevational view of the present invention as viewed from the right side of the embodiment shown in FIG. 1 showing the electrodes in contact with a workpiece and having a portion of the frame cut away showing one of the guide rods and the alignment set screws and springs.

Referring now to FIGS. 1, 2, and 3, there is shown a welding head 10 consisting of a base or platform 12 having a cylindrical portion 14. The base 12 may be of a material such as aluminum which has been copper plated to provide low electrical surface resistance. A column 15 of an electrically conductive material such as brass extends through the cylindrical portion 14 into the base 12 and is coated with a conventional electrical insulating material to insulate it from the base 12 and the cylindrical portion 14. The column 15 is of a length sufficient to allow a portion of it to extend above the top of the cylindrical portion 14 so that a frame 24, of a material such as anodized aluminum can be mounted thereon by a pair of set screws 27 threaded into bores extending across a slot 25 in the frame 24 adjacent to the column 15.

A shaft 16, of a material such as copper which may have been gold plated, is secured by a clamping screw 18 in a bore in the base (not shown) and has pivotably mounted on it a first or fixed electrode assembly 20. A second or movable electrode assembly 26, substantially similar in structure to the first assembly 20, is mounted to one end of a carrier or ram member 26 such as a shaft of case hardened steel that is journalled in a pair of ball bearing bushings retained in a bore 30 in the frame 24 so that its longitudinal axis is coaxial with the longitudinal axis of the shaft 16.

A lever arm 34 of a material such as steel is pivotably attached to the frame 24 at a first end 36, to a welding force member 40 at a second end 38 and to a bracket 41 attached by conventional means to a welding force control assembly 43 at an intermediate point 39. The welding force member 40 is shown typically as a cable that extends through the cylindrical portion 14 to a foot pedal (not shown) for the application of an operating force. While the welding force member has been shown as a cable it should not be limited thereto since conventional hydraulic, pneumatic, or electrical operating means may be substituted without varying from the scope of the invention. The application of a force to the cable 40 in a direction indicated by an arrow 42, FIG. 1, results in the pivoting of the lever arm 34 and the movement of the welding force control assembly 43 in the same direction. To transmit this motion to the shaft 28 a yoke assembly 44 of a material such as aluminum having a finger or projection 46 extends into contact with the welding force control assembly 43 and is clamped to the shaft by a clamping screw 48.

Referring now to FIG. 4, as well as to FIG. 1, the welding force control assembly 43 includes a cylindrical housing 50, of a material such as anodized aluminum, which is positioned in a bore 52 in a pair of opposite sides of the frame so that it is substantially parallel with the shaft 28, and has a length which is greater than the transverse dimension of the frame at this point. Thus by positioning the housing 50 in the bore 52, with one end substantially flush with the outer edge of one side of the frame, a portion 54 of the housing will extend outward from the other side. To facilitate the movement of the housing 50 in the bore 52 a member 56 having a low coefficient of friction such as a Teflon sleeve or a roller bearing may be positioned in the bore before the housing in inserted therein.

The housing 50 contains an elongated aperture 58 at a point along its length substantially opposite the yoke assembly 44 so that the finger 46 extends into the cylindrical chamber of the housing into contact with a resilient member 59 such as a pressure spring which is retained between one side of the finger 46 and a pressure adjustment nut 62. A tare spring 60 is retained by a pair of washers 61 between the other side of the finger 46 and a pin 64 positioned transversely of the chamber and imparts to the pressure spring 59 a biasing force sufficient to maintain it seated against the adjustment nut 62 and the finger 46. The adjustment nut 62 contains a threaded bore 65 into which is threaded a pressure adjustment shaft 64 having an adjustment knob 66 attached to it by a conventional set screw 67 and a dowel 69 extending into a slot 68 in the housing 50 to prevent rotation of the nut 62. By rotating the shaft 64, by means of the knob 66, the pressure adjustment nut 62 is moved up and down the shaft 64. Thus the force applied to the yoke assembly 44 by the movement of the nut 62 is selectively varied to any magnitude as may be desired to be preselected for the welding operation. To provide a visual indication of the welding force for the scheduling of preselected forces, the slot 68 includes a plurality of graduations along its edge so that the relative magnitude of the force is readily determinable by the location of the dowel 69 along the edge.

After each welding operation, to insure an automatic return of the movable electrode assembly 26 to a retracted position as illustrated in FIGS. 1 and 3, a return spring 70 having its ends retained between the frame 24 and the bracket 41 circumscribes a portion 71 of the cylindrical housing 50. As the lever arm 34 is rotated clockwise, as viewed in FIG. 1, by the application of operating force to the cable 40, the resulting movement of the welding force control assembly 43 compresses the spring 70 sufficiently to build up in it a force which will return the movable electrode assembly 26 to the retracted position when the operating force is removed.

Referring again to FIGS. 1 and 2, an adjustable cam member 72 is secured to the yoke assembly 44 in contact with the switch arm of a switch 74 such as a conventional microswitch which is attached to the bracket 41 so that when the movable electrode assembly 26 is in the retracted position the switch arm places sufficient pressure on the switch 74 to maintain it in a deactivated state. As long as the motion of the welding force control assembly 43 is transmitted to the yoke assembly 44 the switch 74 will remain deactivated. Therefore, during the movement of the movable electrode assembly 26 into engagement with a workpiece 75, the switch 74 cannot be activated because the movement of the assembly 43 is transmitted to the yoke 44 through the pressure spring 59. Since the movable electrode assembly 26 and correspondingly the yoke assembly 44 are restricted from further movement by the workpiece 75 any additional force will be applied directly to the workpiece against the preselected force of the pressure spring 59 until the operating force reaches the magnitude of said preselected force thereafter the welding force control assembly 43 moves sufficiently to actuate the switch 74. A first and a second terminal 76, 78, such as conventional lugs, extend out from one side of the base 12. The first lug 76 is threaded into a bore in the column 15 and is electrically insulated from the base 12 while the second lug 78 is threaded directly into a bore in the base 12. Therefore, when a stored energy welding power supply (not shown) such as that described and shown in U.S. Patent No. 2,483,691 by J. W. Dawson, issued October 4, 1949, is connected to the lugs 76, 78 the actuation of the switch 74 enables the power supply to supply electrical energy through the path provided from the second lug 78, the base 12, the shaft 16 to the first electrode assembly 20 and the workpiece 75 and to the movable electrode assembly 26, a conductor 77 such as a copper strap coupling the movable electrode assembly 26 to the column 15, and to the first lug 76.

To eliminate the possibility of the application of an excess amount of welding force to the workpiece, a restraining member 80 such as a screw having a long shaft is threaded into a nut 81 rigidly positioned on the bracket 41. The shaft of the screw 80 extends into a bore in the frame (not shown) and is adapted to have the head thereof engage the frame 24 after the desired vertical movement of the movable head to accommodate workpieces of varying thicknesses. In this fashion the magnitude of the vertical movement of the movable electrode assembly 26 may be controlled by varying the length of the screw 80.

To provide a welding head adaptable to numerous welding operations the first and second electrode assemblies 20, 26 contain numerous adjustable features. The first electrode assembly 20 and the second electrode assembly 26 include substantially the same structure; however, the second electrode assembly incorporates suitable modifications so that it can be adjusted from the same side of the welding head as the first electrode assembly 20. As best seen in FIG. 1, each of the assemblies including a clamp member 100, of a material such as aluminum which has been first copper plated and then gold plated, having a groove 102 extending longitudinal thereof of a depth sufficient to extend into a transverse mounting bore 104 and a longitudinal electrode horn retaining bore (not shown). Each assembly also includes a pair of threaded bores each adapted to receive a clamping screw 106, 107 for clamping respectively the clamp 100 to the appropriate shaft of the welding head and an electrode horn 108 in the clamp 100. The horn 108 is of a suitable material such as a suitable copper alloy which may be gold plated. Each of the electrode horns 108 is typically a cylindrical shaft having at one end a notch 110 and a bore adapted to receive an electrode 112 and a threaded bore having an axis extending at right angles to the notch 110 adapted to receive a clamping screw 113 for clamping the electrode 112 in the electrode horn 108. The electrode 112 is typically of a material such as copper alloy. A registering member or collar 114 of a material similar to that of the clamp member 100 is clamped to each electrode horn 108 at a point intermediate the ends thereof.

In the design of a welding head one of the design parameters is the elimination of transverse or arcuate motion of the movable electrode after it contacts the workpiece. As already briefly mentioned, in the absence of a controlling and restraining mechanism this movement results from the natural tendency of a round electrode tip to "roll off" of a round wire conductor or from "skidding"; that is, the electrode tending to follow the flow of the metal after it becomes liquid by the application of the welding energy. In the design of a commercial, competitively priced welding head the achievement of this parameter is impractical because of the large complexed expensive mechanism that is required. The unique design of the present invention achieves this parameter not by totally eliminating the arcuate movement but by controlling it.

Referring to FIGS. 1, 2, and 3, a controlling and restraining mechanism is illustrated which includes a first guide rod 86 retained in the present embodiment by a pressure fit in a bore 88 in the frame 24 on one side of the shaft 28, a second guide rod 90 retained by a pair of adjustment screws 92, such as flat head set screws threaded into bores in the frame, in a slotted hole 94 on the opposite side of the shaft 28, and attached to opposite sides of the yoke assembly 44 for engagement with the first and second guide rods a pair of antifriction members 96 such as conventional roller bearings. To counteract the force applied by the set screws to the guide rod 90 a pair of springs 97 are retained in bores in the frame and bear against the rod on the opposite side thereof from the set screws.

Due to misalignments or errors in the forming of the bore 88, the rod 86 and the shaft 28 may not be exactly parallel so that when the roller bearing 96 moves in contact with the rod 86 the electrode 112 and the movable electrode assembly 26 may traverse a helical path. However, as long as each of the roller bearings 96 remains in contact with the adjacent guide rod, this helical movement is limited to the predetermined path produced by the nonparallelism between the rod 86 and the shaft 28. Therefore, by positioning or inclining the guide rod 90, by an appropriate adjustment of the set screw 92 until the other roller bearing 96 tracks the second guide rod 90 during the length of travel of the shaft 28, the electrode 112 moves in a predetermined helical path until it contacts the workpiece, thereafter it moves in a linear path because of the restriction of the roller bearings in contact with the guide rods. To prevent the guide rod 90 from falling out of the slotted hole 94 during adjustment and positioning thereof a retaining pin 95 is inserted in a bore in the frame near both ends of the slotted hole 94. While, in the present embodiment, the guide rods have been shown to be positioned in bores in the frame 24 it should be understood that if desired the guide rods may be positioned in slots having suitable retaining pins instead of the bores.

While one embodiment of this invention has been herein illustrated and described it will be appreciated by those skilled in the art that variations of the disclosed arrangement both as to its details and as to the organization of such details may be made without departing from the spirit and scope thereof. Accordingly, it is intended that the foregoing disclosure and the showings made in the drawings shall be considered as illustrative of the principles of this invention and not construed in a limiting sense.

What is claimed is:

1. A welding head comprising:
   a base member;
   a first electrode assembly mounted on said base member;
   a frame member mounted on said base member adjacent to said first electrode assembly and including a movable member;
   a carrier member movably positioned in said frame member;
   a second electrode assembly and a yoke assembly carried by said carrier member;
   a control member adapted to provide a predetermined path of movement for said carrier member and including a pair of guide rods poistioned in said frame member adjacent to said carrier member and a pair of antifriction members mounted to opposite sides of said yoke assembly for engagement with different ones of said guide rods;
   transmitting means disposed between said yoke assembly and said movable member for transmitting the movement of said movable member to said carrier member; and
   means coacting with said movable member to produce movement of said second electrode assembly toward a workpiece positioned in contact with said first electrode assembly, whereby said control member will prevent said second electrode assembly from transverse movements after it makes contact with said workpiece.

2. A welding head comprising:
   a base member;
   a first electrode assembly mounted on said base member;
   a frame member mounted on said base member adjacent to said first electrode assembly and including a movable member;
   a shaft member movably positioned in said frame member;
   a yoke assembly and a second electrode assembly mounted on said shaft member;
   a control member adapted to provide a predetermined path of substantially linear movement for said shaft member including a pair of guide rods positioned in said frame member generally parallel with said shaft member, a pair of roller bearings mounted to opposite sides of said yoke assembly one of which being adapted to make continuous contact with ones of said guide rods and a force means in contact with the other of said guide rods for positioning it for continuous contact by the other of said roller bearings during the movement of said shaft member;
   transmitting means disposed between said yoke assembly and said movable member for transmitting the movement of said movable member to said shaft member; and
   means coacting with said movable member to produce movement of said second electrode assembly toward a workpiece positioned in contact with said first electrode assembly, whereby said control member will prevent transverse movement of said second electrode assembly after it makes contact with said workpiece.

3. A welding head comprising:
   a base member;
   a first electrode assembly mounted on said base member;
   a frame member mounted on said base member adjacent to said first assembly electrode and including a movable member;
   a shaft movably positioned in said frame member and having one extremity extending therefrom and a yoke assembly mounted thereon;
   a second electrode mounted to said one extremity of said shaft;
   a control and restraining member adapted to provide a predetermined path of substantially linear movement for said shaft including a pair of guide rods positioned in said frame member generally parallel with said shaft, a pair of roller bearings mounted to opposite sides of said yoke assembly one of which being adapted to make continuous contact with ones of said guide rods and a compressible force means in contact with the other of said guide rods for positioning it for continuous contact by the other of said roller bearings during the movement of said shaft;
   resilient means disposed between said yoke assembly and said movable member for transmitting the movement of said movable member to said shaft; and
   a lever arm having one end pivotably attached to said frame member and a second end adapted to have a force applied thereto, said arm being pivotably attached to said movable member at a point intermediate said ends,
   whereby the application of said force causes said second electrode assembly to move toward said first electrode assembly in a predetermined path.

4. A welding head comprising:
   a base member;
   a first electrode assembly mounted on said base member;
   a frame member mounted on said base member adjacent to said first electrode assembly including a chamber portion having a welding force control member movably positioned therein;
   a shaft movably positioned in said chamber and having a second electrode assembly mounted thereon;
   a pair of guide rods positioned in said chamber generally parallel with said shaft;
   a yoke assembly mounted on said shaft and having a projection extending from one end thereof and a pair of antifriction members mounted on opposite sides each adapted to make contact with a different one of said guide rods;

a spring member disposed between one end of said welding force control member and said yoke assembly projection for transmitting the movement of said welding force control member to said shaft; and a lever arm having one end pivotably attached to said frame member and a second end adapted to have an operating force applied thereto, said arm being pivotably attached to said welding force control member at a point intermediate said ends, whereby the application of said force causes said second electrode assembly to move toward said first electrode assembly in a predetermined path.

5. A welding head comprising:
a base member;
a first electrode assembly mounted on said base member adapted to have a workpiece in contact therewith;
a frame member mounted on said base member adjacent to said first electrode assembly including a chamber portion having a welding force control member movably positioned therein;
a shaft movably positioned in said chamber and having a second electrode assembly mounted thereon;
first and second guide rods positioned in said chamber generally parallel with said shaft;
a yoke assembly mounted on said shaft having a projection extending from one end thereof and a pair of roller bearings mounted on opposite sides of said assembly, one of said bearings adapted to make continuous contact with said first guide rods;
a compressible force means positioned in said frame member in contact with said second guide rod for maintaining the other of said roller bearings in continuous contact therewith during the movement of said shaft;
a spring member disposed between one end of said welding force control member and said yoke assembly projection for transmitting the movement of said welding force control member to said shaft; and
a lever arm having one end pivotably attached to said frame member and a second end adapted to have an operating force applied thereto, said arm being pivotably attached to said welding force control member at a point intermediate said ends, whereby the application of said force causes said second electrode assembly to move toward said first electrode assembly in a predetermined path so that when said second electrode assembly makes contact with said workpiece it will be restricted from transverse movement.

6. A welding head comprising:
a base member;
a first electrode assembly mounted on said base member;
a frame member mounted on said base member adjacent to said first electrode assembly including a chamber portion having a pair of coaxial bores each in two opposite sides thereof;
a shaft movably positioned in said chamber and having a second electrode assembly mounted thereon;
a movable welding force control cylinder in said frame member extending transversely of said chamber in contact with said bores, said cylinder having a mounting bracket attached thereto;
first and second guide rods positioned in said chamber generally parallel with said shaft;
a yoke assembly mounted on said shaft including a projection extending from one end thereof and a pair of roller bearings positioned on opposite sides thereof, one of said bearings being adapted to make continuous contact with said first guide rod;
a compressible force means positioned in said frame member in contact with said second guide rod for maintaining the other of said bearings in continuous contact therewith during the movement of said shaft;
a resilient means disposed between said yoke assembly projection and one end of said cylinder and having a preselected force adapted to urge said shaft and said cylinder to move in opposite directions, said resilient means being adapted to provide combined movement of said shaft and said welding force control cylinder under predetermined conditions;
a lever arm having one end pivotably attached to said frame member and a second end adapted to have an operating force applied thereto, said arm being pivotably attached to said welding force control cylinder at a point intermediate said ends whereby the application of said force will cause said second electrode to move from a retracted position toward said first electrode in a predetermined path so that when said second electrode assembly makes contact with said workpiece it will be restricted from transverse movement; and
a spring circumscribing said cylinder and disposed between said frame member and said mounting bracket adapted to be compressed by the movement of said drive cylinder for returning said second electrode to said retracted position when the magnitude of said operating force falls below a predetermined level.

7. A welding head comprising:
a base member;
a first electrode assembly mounted on said base member adapted to have a workpiece in contact therewith;
a frame member mounted on said base member adjacent to said first electrode assembly including a chamber portion having a pair of coaxial bores each in opposite sides thereof;
a shaft movably positioned in said chamber and having a second electrode assembly mounted thereon;
a movable welding force control cylinder in said frame member extending transversely of said chamber and in contact with said bores;
a pair of guide rods positioned in said chamber generally parallel with said shaft;
a yoke assembly mounted on said shaft including a projection extending from one end thereof and a pair of anti-friction members mounted on opposite sides each adapted to make contact with a different one of said guide rods;
a resilient means disposed between said yoke assembly projection and one end of said cylinder and having a preselected force adapted to urge said shaft and said cylinder to move in opposite directions, said resilient means being adapted to provide combined movement of said shaft and said welding force control cylinder under predetermined conditions;
a lever arm having one end pivotably attached to said frame member and a second end adapted to have an operating force applied thereto, said arm being pivotably attached to said welding force control cylinder at a point intermediate said ends whereby the application of said force will cause said second electrode to move toward said first electrode in a predetermined path so that when said second electrode assembly makes contact with said workpiece it will be restricted from transverse movement;
means coupled to said lever arm for applying said operating force to said cylinder, said operating force being opposed to said preselected force when said second electrode assembly makes contact with said workpiece;
means enabling further movement of said welding force control cylinder when said operating force has a magnitude substantially equal to that of said preselected force; and
means in a welding circuit mounted on said cylinder for energizing said circuit upon said further movement of said welding force control cylinder.

8. A welding head comprising:

a base member;

a first electrode assembly mounted on said base member;

a frame member mounted on said base member adjacent to said first electrode assembly including a cylinder portion having a pair of coaxial bores each in opposite sides thereof;

a shaft movably positioned in said chamber and having a second electrode assembly mounted thereon;

first and second guide rods positioned in said chamber generally parallel with said shaft;

a movable welding force control cylinder in said frame member extending transversely of said chamber in contact with said bores and having a mounting bracket attached thereto;

a yoke member mounted on said shaft including a projection extending from one side thereof and a pair of antifriction members mounted on opposite sides thereof, one of said antifriction members being adapted to make continuous contact with said first guide rod;

a pair of springs and adjustable set screws positioned in said frame member in contact with said second guide rod for positioning the other of said roller bearings in contact therewith during the movement of said shaft;

a resilient means disposed between said yoke assembly projection and one end of said cylinder and having a preselected force adapted to urge said shaft and said cylinder to move in opposite directions, said resilient means being adapted to provide combined movement of said shaft and said cylinder upon application of said operating force;

a spring circumscribing said cylinder and held between said frame member and said mounting bracket adapted to be compressed by the movement of said drive cylinder for returning said second electrode to a retracted position when the magnitude of said operating force falls below a predetermined level;

a lever arm having one end pivotally attached to said frame member and a second end adapted to have said operating force applied thereto said arm being pivotably attached to said cylinder at a point intermediate said ends whereby the application of said operating force to said second end causes said second electrode to move toward said first electrode in a predetermined path so that when said second electrode assembly makes contact with said workpiece it will be restricted from transverse movement;

means coupled to said lever arm for applying said operating force to said drive cylinder, said operating force being opposed to said preselected force when said second electrode assembly makes contact with said workpiece;

means enabling further movement of only said welding force control cylinder when said opposing force has a magnitude substantially equal to that of said preselected force; and means in a welding circuit mounted on said cylinder for energizing said circuit upon said further movement of said welding force control cylinder.

References Cited by the Examiner

UNITED STATES PATENTS 2,872,564  2/59  Du Fresne et al. _____ 219—86
3,036,199  5/62  Page _____ 219—86

RICHARD M. WOOD, *Primary Examiner.*